(12) United States Patent
Bauer et al.

(10) Patent No.: US 9,962,746 B2
(45) Date of Patent: May 8, 2018

(54) DEVICE FOR CLEANING PIPES

(71) Applicant: IMS INGENIEURBÜRO GMBH, Dresden (DE)

(72) Inventors: Jens Bauer, Langebrück (DE); Thomas Hache, Dresden (DE)

(73) Assignee: IMS Robotics GmbH, Ottendorf-Okrilla (DE)

( * ) Notice: Subject to any disclaimer, the term of this patent is extended or adjusted under 35 U.S.C. 154(b) by 42 days.

(21) Appl. No.: 14/933,653

(22) Filed: Nov. 5, 2015

(65) Prior Publication Data

US 2016/0129486 A1    May 12, 2016

(30) Foreign Application Priority Data

Nov. 7, 2014 (EP) ..................................... 14192268

(51) Int. Cl.
| | | |
|---|---|---|
| *B08B 9/032* | (2006.01) | |
| *B08B 9/027* | (2006.01) | |
| *B08B 9/049* | (2006.01) | |
| *B05B 3/00* | (2006.01) | |
| *B05B 13/06* | (2006.01) | |
| *H04N 5/217* | (2011.01) | |

(Continued)

(52) U.S. Cl.
CPC .............. *B08B 9/0321* (2013.01); *B05B 3/00* (2013.01); *B05B 13/0627* (2013.01); *B08B 9/027* (2013.01); *B08B 9/0495* (2013.01); *H04N 5/2171* (2013.01); *H04N 5/2253* (2013.01); *H04N 7/183* (2013.01); *H04N 2005/2255* (2013.01)

(58) Field of Classification Search
None
See application file for complete search history.

(56) References Cited

U.S. PATENT DOCUMENTS 2,909,327 A  * 10/1959  Li ............................. B05B 3/00
                                                                239/229
2005/0045751 A1 * 3/2005  Nance .................. B05B 15/061
                                                                239/587.1

(Continued)

FOREIGN PATENT DOCUMENTS

| DE | 102009007946 | 3/2011 | |
| DE | 202010016857 U1 * | 4/2011 | ............. B08B 9/049 |

(Continued)

OTHER PUBLICATIONS

European Search Report issued by the European Patent Office in Application EP 14 19 2268.

*Primary Examiner* — Jason Ko
*Assistant Examiner* — Cristi Tate-Sims
(74) *Attorney, Agent, or Firm* — Ursula B. Day

(57) ABSTRACT

A device for the cleaning of pipes, such as household waste and sewer pipes is proposed, the device includes a nozzle movable in at least three axes within a pipe for providing a jet of cleaning fluid directed to soilage in pipes; a cleaning hose for supply of cleaning fluid is connected to the nozzle and a swivel mechanism for deflecting the nozzle at an angle relative to a longitudinal axis, a front end portion of the hose is bent in a bending direction in a bending plane; at least one drive for deflecting the nozzle around the longitudinal axis by changing the direction of bending and the bending plane without torsion to the cleaning hose.

15 Claims, 9 Drawing Sheets

(51) Int. Cl.
*H04N 5/225* (2006.01)
*H04N 7/18* (2006.01)

(56) References Cited

U.S. PATENT DOCUMENTS

| | | | | |
|---|---|---|---|---|
| 2005/0252531 | A1* | 11/2005 | Landaas | B08B 9/027 134/22.11 |
| 2012/0204368 | A1* | 8/2012 | Zink | B05B 12/04 15/104.05 |
| 2015/0266036 | A1* | 9/2015 | Andersen | B05B 1/3013 239/563 |

FOREIGN PATENT DOCUMENTS

| | | |
|---|---|---|
| DE | 202010016857 | 5/2011 |
| DE | 202011000650 | 12/2011 |
| DE | 202014000026 | 4/2014 |
| EP | 2 278 082 | 1/2011 |
| WO | WO96/26020 | 8/1996 |

* cited by examiner

DEVICE FOR CLEANING PIPES

CROSS-REFERENCES TO RELATED APPLICATIONS

This application claims the priority of European Patent Application Ser. No. 14192268.2, filed Nov. 7, 2014, pursuant to 35 U.S.C. 119(a)-(d), the subject matter of which is incorporated herein by reference.

BACKGROUND OF THE INVENTION

The present invention relates to a device for cleaning pipes, in particular, sewage pipes from household- or industry waste water.

Incrustations, depositions, biofilm and formations at pipe walls in pipe systems represent a considerable problem in connection with sewage pipes, water treatment plants, in ground water remediation, and in industrial installations. Construction damage through road works can lead to blockages in underground sewage systems due to, such as, for example, concrete that has penetrated through cracks or ingrown tree roots. Torrential rain can render sewer lines blocked by leaves, refuse and similar material. Industrial, domestic and mining waste water normally contain a great array of nutrients that are microbially useful and that thus leads to a disproportionally strong growth of biofilm at the walls of the pipes up to complete blockages. The cleaning capacity of water treatment plants is thus hampered and the quality of the treated waste water reduced while interrupting operation for costly cleaning work is necessary.

Drainage units and dewatering of tunnel systems and streets particularly in hillside locations are likewise affected by this. A stoppage to conduct maintenance and remediation can already represent a hardship for the local economy.

When penetration of foreign objects or pipe blockages occur, usually the pipes are either entirely impaired or are only partially usable. Pipes that are completely blocked can be unblocked with only considerable and costly effort or sometimes cannot be totally freed from these foreign objects, as for example under streets, houses, transformer stations, walls and other such structures.

Conventional cleaning methods such as mechanical cleaning or customary rinsing techniques are borderline effective. Mechanical cleaning has the added danger of damaging the pipes. This refers also to the flushing technique that utilizes spin chains in addition to flushing jets. The flushing technique results sometimes only in an inadequate cleaning when the encrustations are very resistant, or the depositions at the pipe wall are biofilms. The high turn around time in the prescribed maintenance intervals leads to economic loss for the operators of the pipe systems because of long cleaning cycles.

Various devices and methods are known for eliminating such problematic sites. Basically, there are a variety of mechanical, chemical and hydrodynamic pipe cleaning devices and/or methods available.

When applying mechanical pipe cleaning, flexible spirals are manually inserted into the pipe that are mostly put into rotation by an electric drive. Thus, solid depositions are eliminated from the inner pipe walls. These devices are very common, however their limitation shows when the encrustations are tougher than the pipe wall itself. This is particularly so with pipes from plastic that have, during their lifetime, become brittle due to evaporation of softener in the plastic. The stress through repeated striking when applying mechanical pipe cleaning systems can lead to pipe breakage.

When applying chemical pipe cleaning, the intention is to dissolve the encrustation. For this purpose, special cleaning liquids, mostly acids of a certain concentration are introduced into the pipe. The success of that type of cleaning is however quite uncertain, as the chemical reactions in the pipe to be cleaned happen in a rather uncontrolled manner. Under certain circumstances, this cleaning process has to be repeated multiple times until the desired cleaning effect has been realized. A disadvantage is thereby the considerable burden on the environment due to the chemicals utilized.

The hydrodynamic pipe cleaning has been established especially for sewer cleaning. Thereby, a rinsing head is inserted into the pipe to be cleaned and a pressurized cleaning liquid introduced via a rinsing hose connected to the rinsing head. In this manner, the cleaning liquid not only serves the cleaning of the walls but also generates a forward motion of the rinsing head due to the principle of recoil force. For this purpose, the rinsing head is provided with several rearward oriented bores such that emission of the high pressure liquid sprays on the one hand cleans soilage from the pipe inner walls and on the other hand the rinsing head generates the forward motion. Thus, the rinsing head must only be inserted into the starting opening of the pipe from where it then moves through the pipe system on its own. Those systems require the majority of the working liquid for the forward feed, whereby the working liquid reaches the pipe with great speed in opposite direction to the rinsing head.

For the removal of tough encrustations, such as for example lime scale and urine scale build-up, a high pressure spray, that is, pressures of up to several hundred bar is required. While rinsing heads with pressures of up to 200 bar and flow-through amounts of several hundred 100 l/per minute up to 1400 l/per minute are also in operation, the energy emitted from the nozzles are only partially converted into cleaning capacity. The greater portion serves the forward motion of the rinsing head and the transport of loose material such as for example loose stones, gravel and sand that are carried off by the rinsing water stream.

With the maximum pressure water-jet robotics, a rotating liquid jet under high pressure and high velocity is directed toward the material to be removed whereby, the majority of kinetic energy is used to eliminate the faulty site. Maximum pressure water-jet robotics is derived from the method of water jet cutting. In water jet cutting, the material to be treated is subjected to maximum pressure water jet for separation. This jet carries a pressure of up to 6000 bar and reaches exit velocities up to 1000 m/s. The maximum pressure water jet allows treatment of almost all materials from foamed material up to cutting a sapphire. The maximum pressure water jet has much application in the plastics field, in the fields of metal treatment, leather- and stone treatment. By pivoting a cutting head with a cutting vector drive, as in a 3D cutting, any number of complex shapes can be cut in spatial dimension.

DE 20 2014 000 026 U1 describes a device for the treatment of pipe walls of closed sewer systems by means of maximum pressure liquid jet with a nozzle body having at least one jet nozzle. The jet nozzle is disposed at the front end of the device and serves the creation of a forwardly directed focused jet of a liquid medium. The forward motion of the jet includes that the jet direction matches the axis of the sewer pipe and also that the direction of the jet, or the jets, have an angle of $-90°<\alpha<90°$ relative to the sewer pipe axis depending on the type and degree of the depositions and obstructions. To that end, a focused jet is a jet that is created by means of a nozzle opening with a much reduced diameter, locally applied with high force to the material to be removed. To remove large scale material, a greater number of nozzles are utilized and/or the nozzle or the jet is moved to scan across the respective surface. A scanning is for example realized through a rotation nozzle, where the nozzle body itself rotates or, in the area of the jet exit from the nozzle body, for example, a finger-shaped insert rotates in the hollow space in front to the output such that the emerging jet circles resulting in a conical jet formation. The device includes a movable carriage for moving and positioning of the nozzle body in the sewer canal in addition to a medium supply to supply the nozzle jet with a medium under high pressure. The carriage and the nozzle body are constructed so that both can be positioned, at least along the entire length of their bottom side, at a distance to the walls of the sewer canal. A pneumatic or hydraulic activated fixing pad is arranged at the rear of the carriage and configured in such a way that in an actuated state the position of the carriage can be fixed in the canal by pressing the fixing pad but without closing off the canal.

The maximum pressure water jet robotics is a very recent method utilized in pipe cleaning. Working pressure is usually 1000 to 2500 bar. Currently on the market for the maximum pressure water jet robotics is the system by Mauerspecht GmbH. The Drain-Jet Robotics® is designed for pipe cross sections of from DN 180 with which a controlled and camera-supported removal of residue can be realized. This is accomplished in substantially shorter time as compared to using the conventional grinding robots or hydrodynamic pipe cleaning systems. The cutting of inliners, the removal of calcium- and concrete depositions as well as the cutting of steel foreign bodies can be realized at a very high level. This system is however limited in its application since it can be utilized with straight pipes only and for sleeve misalignments only from DN 250.

From DE 10 2009 007 946 A1, a device is known for hydrodynamic cleaning of inner pipe walls, in particular water carrying pipes in the domestic area which includes a high pressure cleaning nozzle with a high pressure cleaning hose attached thereto for supplying pressurized cleaning liquid, especially water. The cleaning device further includes a flexible, pressure stable bar or rod-shaped sliding device, with a high pressure cleaning nozzle is disposed at one end and suitable for insertion into the pipe to be cleaned. The cleaning device comprises in addition a pipe suitable carriage on which the high pressure cleaning nozzle and/or a portion of the high pressure hose extension is fastened. The cleaning work can be monitored with a camera connected to a video data line that is disposed in proximity of the high pressure cleaning nozzle. Thereby, the high pressure cleaning nozzle is moved by means of the bar- or rod shaped moving device to the location to be cleaned. This system operates normally with a pressure of 100 bar to maximal 500 bar.

As a further system, steerable satellite rinsing cameras are available on the market. These systems exploit the low pressure water jet directed rearward toward the pipe wall in order to move along the pipe. An additional utility, a certain cleaning effect of the rearward pipe is realized. In order to examine the condition and thus determine the correct functional condition or check leakage of the pipe, a further camera navigates the process to be carried out. Solid depositions, protruding obstacles cannot be eliminated with such a system.

DE 20 2010 016 857 U1 describes a high pressure water jet device which includes a flat bed driver carriage moving on four wheels with a nozzle bracket mounted at the front end. The nozzle bracket holds a nozzle with several nozzle openings in radial orientation relative to the canal and vertical to the drive direction. The nozzle bracket includes a pivot arm mounted at the front end of the carriage. By means of the pivot arm the nozzle is, for example, movable in two drive directions; perpendicular as well as parallel to each other. In addition, the nozzle is pivotable around its horizontal, parallel to the driving direction oriented swivel axis, which, for example, may be the axis of the nozzle pivotable around 360°. If a firm connection of the nozzle to the medium supply has been established, the nozzle swivels alternating around the 360°. Additionally, a camera is provided which is suitable to detect the environment of the canal, for example any branching in the canal or any obstacles, so that corresponding to the situation, an operator outside the canal can react to preprogrammed alerts of the device. A camera can also capture an image of the controls and transmit the photo images to the outside operator.

DE 20 2011 000 650 U1 describes a device for the examination and cleaning of pipes and pipe lines, in particular sewer lines that include a cleaning head additionally provided with a camera and wherein each of these are disposed at the end of the high pressure hose. The cleaning head is provided with one or more circumferentially disposed nozzles that are optionally configured for controlling and switching actions. The nozzles can move the cleaning head precisely in one direction and can direct it simply into an arm of the canal. To control the position, the camera images are consulted. The nozzle or nozzles at the circumference are configured rotatable and can be operated by a motor. The rotatable nozzle can always be pivoted in precise manner in the opposite direction in which the cleaning head is being moved. According to a variant, it is also possible to dispose the circumferential nozzle at the center axis so that it can revolve around this center axis.

Also offered on the market are canal milling robots by various producers that are utilized for operation on canal rehabilitation. The robot is for that purpose provided with a milling motor that can be driven by hydraulic or pneumatic means. Especially constructed milling tools are utilized for the deposited materials to be removed. The milling tool allow only a point removal of the material deposition. Manual control and the characteristics of the milling tools render any removal of deposition without contacting the canal wall and thus non-damaging not feasible or feasible only through excessive use of time.

A further commonly-used method is the removal of obstacles in the older pipes by means of spin ropes and spin chains. Spin chains are usually used in removal of solid depositions such as calcium, cement slurry, roots and such. Thereby, the driving nozzle rotates with the same speed as the chains to realize a precisely defined grinding effect within the pipe. While the chains should always correspond to the pipe size, the inner wall surface of the pipe is always being affected and camera monitoring cannot permanently cover the entire work process. A final check is carried out at the end of the process by means of a separately conducted camera check. If the cleaning result was not satisfactory, the process has to be repeated.

SUMMARY OF THE INVENTION

The present invention resolves prior art problems such as the transmission of a high pressure medium requiring a reinforced hose which is flexible enough for the swivel motion but which is so torsion-resistant that it does not generate a rotating motion. Furthermore, a degree of rotation of the hose of more than 400° is not possible, so that in this manner an endless rotation of the nozzle around the pipe longitudinal axis cannot be realized.

It would therefore be desirable and advantageous to provide an improved pipe cleaning device to obviate prior art shortcomings and to provide a device for cleaning pipes which has pipe bend mobility and/or is self-driving for insertion into the pipe and is suitable for the cleaning of sewer pipes for domestic and industrial waste water, as well as for other pipes, for example for drainage, The device should serve the elimination of all types of soilage in pipes by means of a high pressure-nozzle jet, whose remote-controlled orientation should reach the soiled location while being monitored by a camera. This requires a targeted pinpointed orientation of the nozzle along several axes, at least:

in axial direction,
pivotable in the angle relative to the longitudinal axis of the pipe and
as rotation around the longitudinal axis of the pipe.

According to one aspect of the present invention, a pipe cleaning device includes a nozzle movable in at least three axes relative to an inner wall of a pipe and to generate a jet of a cleaning fluid to be directed at any point on the inner pipe wall; a hose connected to the nozzle to supply the fluid cleaning medium, wherein the nozzle is disposed at a front end portion of the hose and the nozzle with the hose connected to it is axially movable within the pipe along a longitudinal axis parallel to a pipe axis; at least one swivel mechanism to deflect the nozzle at an angle between 0° and 90° relative to the longitudinal axis while the front end portion of the cleaning hose is bent away from the hose axis with a bending direction in a bending plane; at least one device to deflect the nozzle around the longitudinal axis by changing the bending direction and the bending plane of the front end portion around the longitudinal axis without generating torsion in the hose; and a camera to record the pipe soilage and monitor the deflection and orientation of the nozzle.

According to another aspect of the present invention, the cleaning hose is provided with means for preventing torsion of the cleaning hose. Means are for example a ball bearing or slide bearing, or a rotary action at the cleaning hose. A device for a rotary action and at least one bearing at the cleaning device for preventing torsion of the cleaning hose are possible.

According to the concept of the present invention, through axial mobility, the swivel mechanism and the device for deflection of the nozzle around the longitudinal axis it is possible to orient the nozzle and the end portion of the cleaning device in at least three dimensions.

According to an advantageous embodiment of the present invention, the device comprises at least one rotary drive for deflecting the nozzle relative to the longitudinal axis and rotating the swivel mechanism around the cleaning hose and around the longitudinal axis. Preferably, at least one bearing is provided for the drive and/or the nozzle at the cleaning hose, by means of which the swivel drive is rotatable around the cleaning hose and its front end portion and around the nozzle or nozzle axis without any torsion of the cleaning hose. In this embodiment, at the rotation of the swivel mechanism around the cleaning hose the nozzle rotates not around its own axis, as the nozzle is firmly connected to the front end portion of the cleaning hose. Through rotation of the swivel mechanism, bending of the front end area of the cleaning device is adjustable in correspondence to the bending plane and bending direction in one of each of the rotation positions of the swivel mechanism around the cleaning hose. Since the swivel drive can continually rotate around the cleaning hose, the nozzle thus deflects in all directions around the longitudinal axis. Preferably, there is at least one bearing for the swivel drive at the cleaning hose and/or the nozzle with which the swivel drive is rotatable without torsion around the cleaning hose and its front end portion and nozzle.

According to an alternative embodiment of the present invention the mechanism for the nozzle deflection around the longitudinal axis comprises a majority of swivel drives positioned around the cleaning hose by which bending of the front end area into various bending directions and bending planes can be adjusted, depending which swivel drive is activated for which bending direction and bending plane. Each of the swivel drives represents thus a swivel mechanism within the sense of the present invention or is part thereof. In addition, the number of swivel drives allows to select a certain swivel drive with a particular bending plane and bending direction of the front end area of the cleaning hose and additionally permits a deflection of the nozzle around the longitudinal axis. Thus, in this embodiment each swivel drive and swivel mechanism or part of the swivel mechanism, as well as a part of the device for the deflection of the nozzle around the longitudinal axis, functions without torsion in the cleaning hose. With the choice of adjacent swivel mechanisms, intermediate positions can be realized.

In a further embodiment of the present invention, the device for the nozzle deflection around the longitudinal axis comprises a rotation action which can be positioned between nozzle and cleaning hose or at any site between two hose sections of the cleaning hose, by which the nozzle is rotatable around the longitudinal axis without torsion of the cleaning hose.

According to an advantageous embodiment of the present invention, the camera is a connected to the swivel drive in such a way that it can swivel and rotates together with the swivel drive. Preferably, the camera includes a unit for a permanent camera cleaning. In a preferred embodiment of the present invention, the swivel drive includes a pivot arm which is swivel mounted perpendicular to the longitudinal axis, and a swivel drive motor. According to an advantageous variant of this embodiment of the present invention, the camera is also mounted on the pivot arm in alignment with the pivot arm. Thereby, the camera can follow the movement of the cleaning nozzle and the focused jet. According to an alternate embodiment, the camera is mounted separately, that is, aligned independent of the swivel drive and pivot arm.

In a further advantageous variant of the device according to the present invention, the device includes a housing with the cleaning hose extending through the housing along the longitudinal axis. Advantageously, the housing or at least a part thereof that houses a section of the cleaning hose which extends along the longitudinal axis, is configured for rotation. Advantageously, the housing has a connection to the swivel drive. This connection is designed such that a rotation movement of the housing around the cleaning hose leads to a corresponding rotation of the swivel drive around the cleaning hose and optionally the nozzle.

Preferably, one or more axial drives are provided for axial movement of the cleaning nozzle along the longitudinal axis or parallel thereto, so that the axial motion represents a dimension along which the nozzle can be aligned.

Such an axial drive may include one or more rearward directed bore holes or nozzles, which are preferably placed at the rear of the housing and to which the fluid cleaning medium are supplied. A forward motion of the device is realized based on the recoil principle when the fluid cleaning medium streams from the bores or nozzles. Preferably, a valve is provided between the front nozzle and the rearward bores that control the distribution of the fluid cleaning medium. Alternatively, there may be two separate controls for the cleaning fluid supply, one for the front nozzle and one for the rear bores or rear nozzles.

The device can be axially movable by the forward move of the cleaning or feed hose. Alternatively, the device is configured axially expandable so that an axial forward move of the nozzle parallel to the longitudinal axis can be realized.

The device may be provided with wheels for an axial movement of the device as part of a drive and placed in rear of the housing.

According to a further variant of the present invention, the device includes a fixation unit capable of radially expanding within the pipe, such that at maximal expansion a fixation of the device within the pipe by pressure from the fixation unit can be realized. Such a fixation unit is suitable to counteract the thrust generated from the jet of the front nozzle or an axial motion of the device. The fixation unit includes recesses which at maximal expansion of the fixation unit serve as drainage means for the fluid cleaning medium and soilage so it can pass the device preferably between the fixation unit and inner wall of the pipe.

BRIEF DESCRIPTION OF THE DRAWING

Other features and advantages of the present invention will be more readily apparent upon reading the following description of currently preferred exemplified and non-limiting embodiments of the invention with reference to the accompanying drawings, which show in.

DETAILED DESCRIPTION OF PREFERRED EMBODIMENTS

Figure 1:
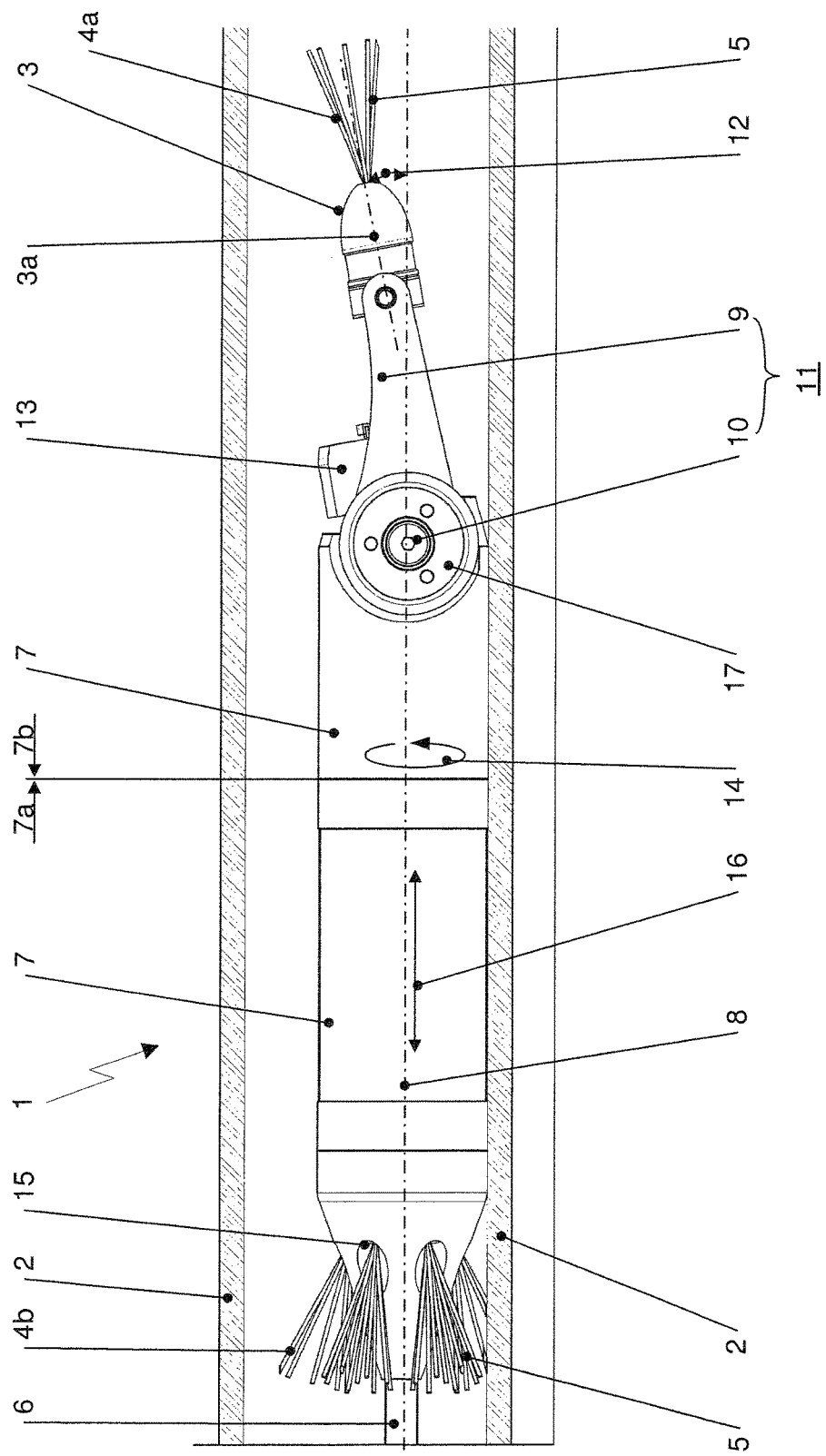
FIG. 1 a device for cleaning pipes with a cleaning nozzle according to the present invention.

FIG. 1 shows a device 1 for cleaning a pipe 2. This device 1 comprises a nozzle 3 movable relative to the inner wall of the pipe 2 to generate a forward directed focused jet 4a of a fluid cleaning medium 5, for example, water. Device 1 further includes a cleaning hose 6, preferably a high pressure cleaning hose 6 connected with nozzle 3, for supplying the fluid cleaning medium 5. Additionally, device 1 includes a housing 7 through which the cleaning hose 6 is extending along a longitudinal axis, not shown here in detail. Nozzle 3 is located at a front end area 6a of cleaning hose 6 (not shown here in detail), located outside in front of the housing 7. A movable pivot arm 9 is also connected, proximate the nozzle 3, to the front end area 6a of the cleaning hose 6. The movable pivot arm 9 is supported for pivoting at a pivot axis 10 and positioned perpendicular to the longitudinal axis 8 at the front 7b of housing 7. A swivel drive motor disposed inside the housing moves the pivot arm 9 around the pivot axis 10. Pivot arm 9, pivot axis 10 and the swivel drive motor combined make up a swivel mechanism 11 in form of a swivel drive 11. The pivot motion 12 of pivot arm 9 allows moving the front end 6a of the cleaning hose 6 together with the firmly attached nozzle 3, which means the nozzle 3 deflects at an angle relative to the longitudinal axis 8. This embodiment shows a bend in the cleaning hose 6 in the front end 6a, wherein this bend follows a vertical bending plane in an upward bending direction. Thus, a pivot motion 12 of nozzle 3 and the front end 6a of the cleaning hose 6 can be realized along a pivot direction 12 shown in FIG. 1 by an arrow. A camera 13 is fastened at the pivot arm 9 in the area between the pivot axis 10 and nozzle 3, with the camera lens directed in forward direction so that the camera 13 can capture obstacles or soilage in pipe 2, as well as the orientation of nozzle 3 and the frontward jet 4a of the fluid cleaning medium 5, as well as capture its cleaning effect.

Housing 7 is divided in two housing parts 7a and 7b. Housing part 7b is preferable configured for endless rotation 14 around the longitudinal axis 8 and around the cleaning hose 6 as indicated by the rotation arrow 14. The connection of the housing or housing part 7b with the swivel drive 11 leads to a rotary motion of the housing part 7b around the cleaning hose 6 and the longitudinal axis 8 to a corresponding rotation of the swivel drive 11 around the cleaning hose 6. This includes a rotary motion of the swivel drive 11 around the front end area 6a and the nozzle 3 respectively, axis 3a of nozzle 3. Nozzle 3 as shown in the embodiment in FIG. 1 is firmly connected with cleaning hose 6 and thus rotates at the rotary motion 14 of the swivel drive 11 also around the longitudinal axis 8 and the cleaning hose 6 and not around its own axis 3a.

The cleaning medium 5 in device 1 as in FIG. 1 not only serves cleaning the walls of pipe 2, but generates a forward motion of device 1 based on the recoil principle. To this end, the device 1 includes a plurality of rearward directed bores 15, from which the rearward directed jets 4b of the cleaning medium 5 are sprayed thereby realizing cleaning soilage from the inner walls of pipe 2, but which also create an axial forward motion 16 of device 1 along the longitudinal axis 8. Wheels 17 are provided to promote the axial forward motion 16 of the cleaning hose 6 and the device 1 through the pipe 2 as shown in FIG. 1.

Figure 2:
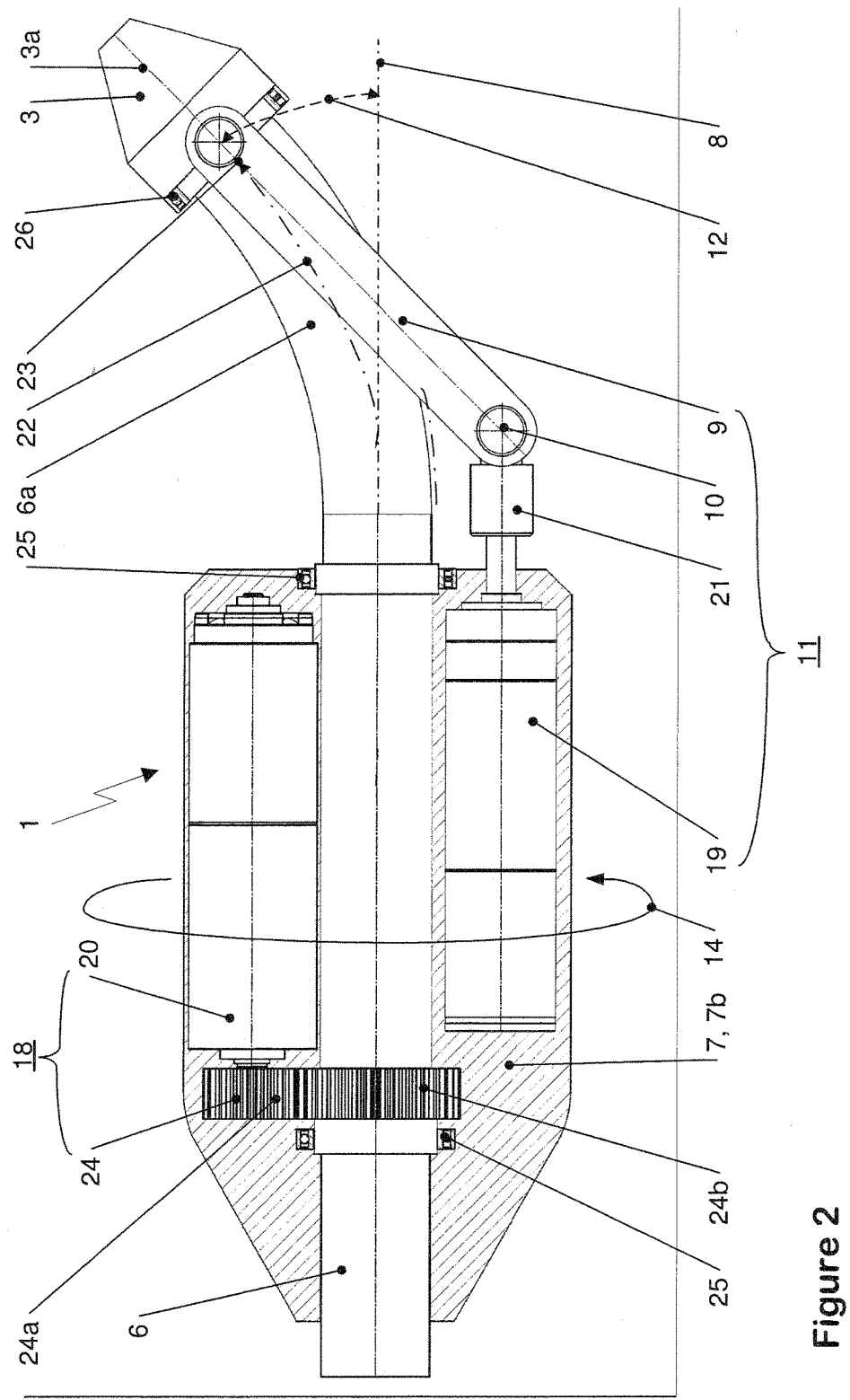
FIG. 2 a longitudinal section of the device for cleaning pipes and a detailed view of a rotary drive and a pivot arm for the cleaning nozzle.

FIG. 2 shows a longitudinal section view of device 1 for cleaning pipes with a detailed view of the swivel mechanism 11 and rotary drive 18 for rotating housing 7, respectively the housing part 7b and the swivel drive 11 around the cleaning hose 6. Shown in a preferred variant of this embodiment is an electric motor swivel drive 11 with a swivel drive motor 19 and an electric motor rotary drive 18 with motor drive 20 being used. With the swivel drive motor 19, the pivot arm 9 is pivotable around pivot axis 10 which permits bending the front end area 6a of the cleaning hose connected to the free end of pivot arm 9. Such a bend results from a pivot motion 12 of the nozzle 3 disposed at the front end area 6a of the cleaning hose 6. The swivel drive motor 19, as shown in the embodiment in FIG. 2, is a spindle motor 19 having a linear moving spindle nut. The linear motion of spindle nut 21 results in a pivoting motion of pivot arm 9 around pivot axis 10 and thus a pivot motion 12 respectively, deflection 12 of nozzle 3 at an angle relative to the longitudinal axis 8. A bending of cleaning front end area 6a of hose 6 and hose axis 22 in a bending direction 23 and a bending plane follows; and as shown in FIG. 2, the hose axis 22 is bent along a vertical bending plane. The arrow shown at the bent hose axis 22 has a bending direction 23 in the vertical plane that extends upward.

Figures 3A, 3B:
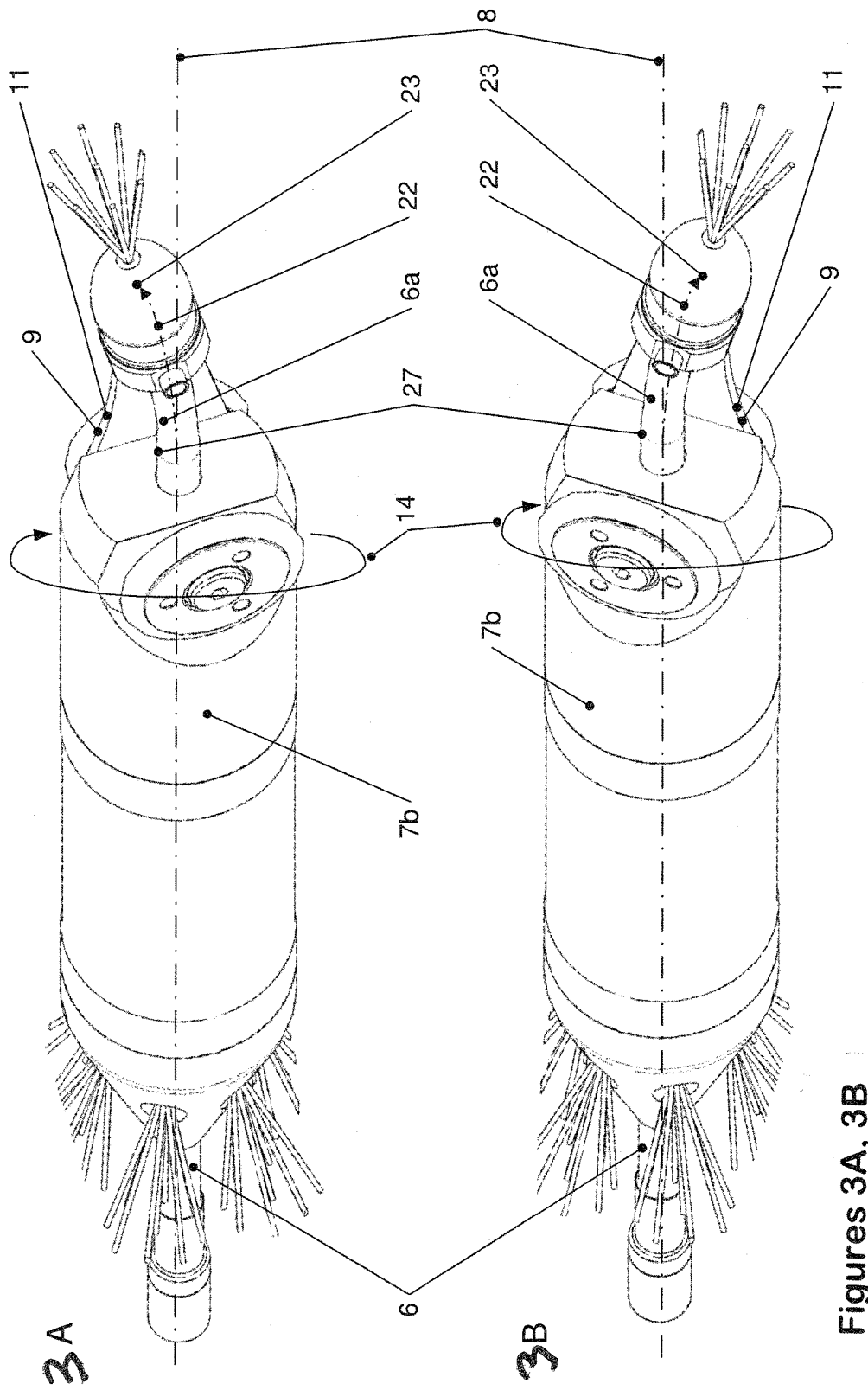
FIG. 3 a schematic illustration of a swivel drive rotating around the cleaning hose.

The rotation of housing 7 respectively the rotatable housing part 7b is realized via a rotary motor drive 20 which is firmly connected with housing part 7b. Via a gear drive 24, the housing part 7b, due to the rotary motion of rotary motor drive 20 around the cleaning hose 6, is able to carry out a rotation 14 around the longitudinal axis 8 and the cleaning hose 6. For this purpose, a first gear 24a is disposed at the rotation axis of the rotary motor drive 20. This first gear 24a corresponds with a second gear 24b, which is fastened at the circumference of the cleaning hose within the housing 7. Through the rotary motion 14 of housing part 7b around the longitudinal axis 8 and the cleaning hose 6, the pivot arm 9 is rotated simultaneously around the front end area 6a of cleaning hose 6, whereby the nozzle 3, firmly connected with the front end area 6a of cleaning hose 6, does not rotate around its own axis 3a. For greater ease of rotating housing part 7b and pivot arm 9 around the cleaning hose 6 and the nozzle 3 or nozzle axis 3a, two ball bearings 25 are disposed between the cleaning hose 6 and the housing 7, and a ball bearing 26 in the area of nozzle 3 around the front end section 6a. The ball bearings 25, 26 serve as support means 25, 26 to avoid any torsion of the cleaning hose 6. Other means of bearings are also possible. FIG. 3 illustrates schematically the rotation process of housing part 7b and the swivel drive 11 around the cleaning hose 6 in simplified form, For example, this view omits the camera as well as parts of the swivel drive 11 which would obstruct the view to the front end area 6a of the cleaning hose 6. FIG. 3 in positions A and B shows the respective positions of a rotation 14 of housing part 7b around the stationary cleaning hose 6 and longitudinal axis 8 at an angle of >180°. The visible parts of the swivel drive 11 in positions A and B are not identical, they represent pivot arms 9 opposite each other, wherein in each position A and B, one of the pivot arms, which could obstruct the view onto the front end area 6a of the cleaning hose 6, is not shown. The cleaning hose 6 itself and also the nozzle 3 firmly connected thereto do not rotate around the hose axis 22. Rotary positions in FIGS. 3A and 3B illustrate this by the non-rotating reference point 27 at the circumference of cleaning hose 6. Through the rotation of swivel drive 11 around the cleaning hose 6 by >180° as seen in FIG. 3, the bend forms in the end area 6a of the cleaning hose 6 in a corresponding bending plane when in one of the rotary positions in FIG. 3 of the swivel drive 11 around the cleaning hose 6. As a rotation by >180° occurs the bending planes for both positions seen in A and B differ. Also the bending directions 23 differ at positions in A and B of FIG. 3. Thus, the front end area 6a in position A relative to the longitudinal axis 8 is deflected upwards, while the front end area 6a in position in B relative to the longitudinal axis 8 is deflected downward without the reference point 27 of the cleaning hose being rotated.

Figure 4:
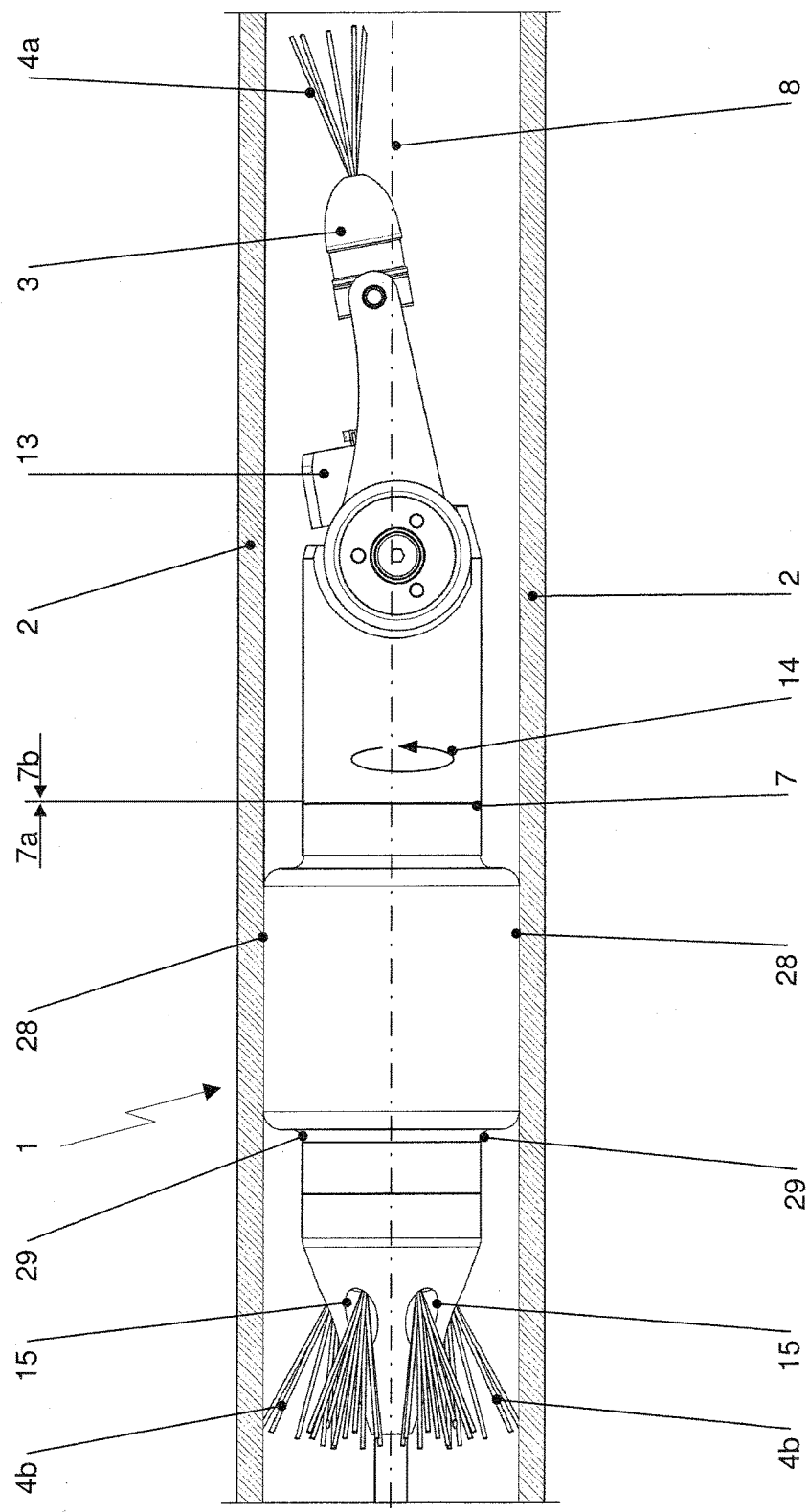
FIG. 4 a device for cleaning of sewer pipes having a cleaning nozzle with a fixation unit in action.

FIG. 4 shows the device 1 for cleaning a pipe 2 with an activated fixation unit 28, that is, a fixation unit 28 in expanded condition. To counter the thrust from the front jet 4a of nozzle 3, or the axial forward motion by the high pressure jets 4b from the rearward directed bores 15, an expandable fixation unit 28 is provided at the outer wall 29 of housing part 7a which is non-rotatable relative to the rotation 14 around the longitudinal axis 8, and positioned in the area between the rotatable housing part 7b and bores 15. The fixation unit is activated by pneumatic, hydraulic or electric means. Expansion of fixation unit 28 up to the inner walls of the pipe 2, results in pressing the fixation unit 28 in pipe 2 and thus a fixation of the device 1.

Figure 5:
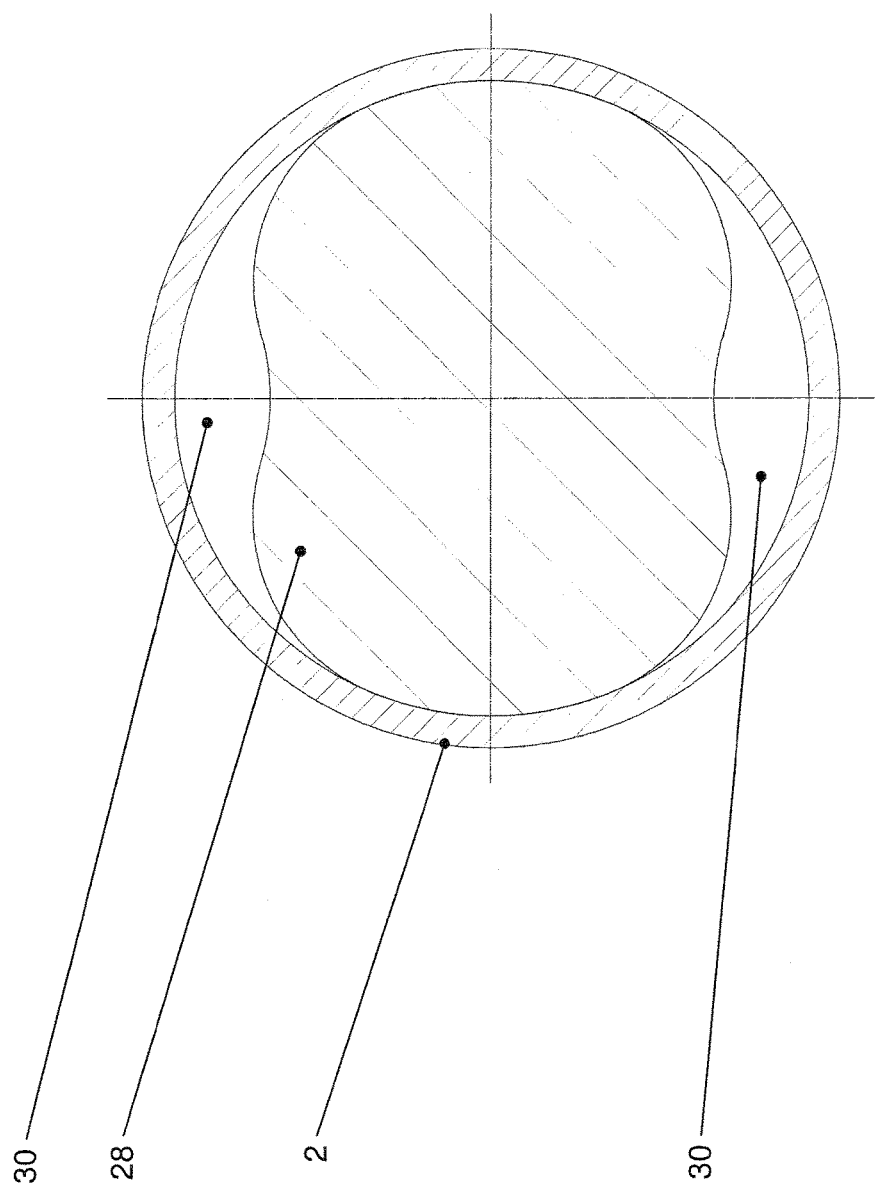
FIG. 5 a cross section view of the fixation unit in action.

FIG. 5 shows the cross section of a pipe 2 with a pressure set fixation unit 28. Also seen are the recesses 30 that are formed between the outer surface of the fixation unit 28 and the inner wall of pipe 2. This allows the cleaning fluid 5 together with soilage flowing through pipe 2 even while the fixation unit 28 is in its pressed and expanded condition.

Figure 6:
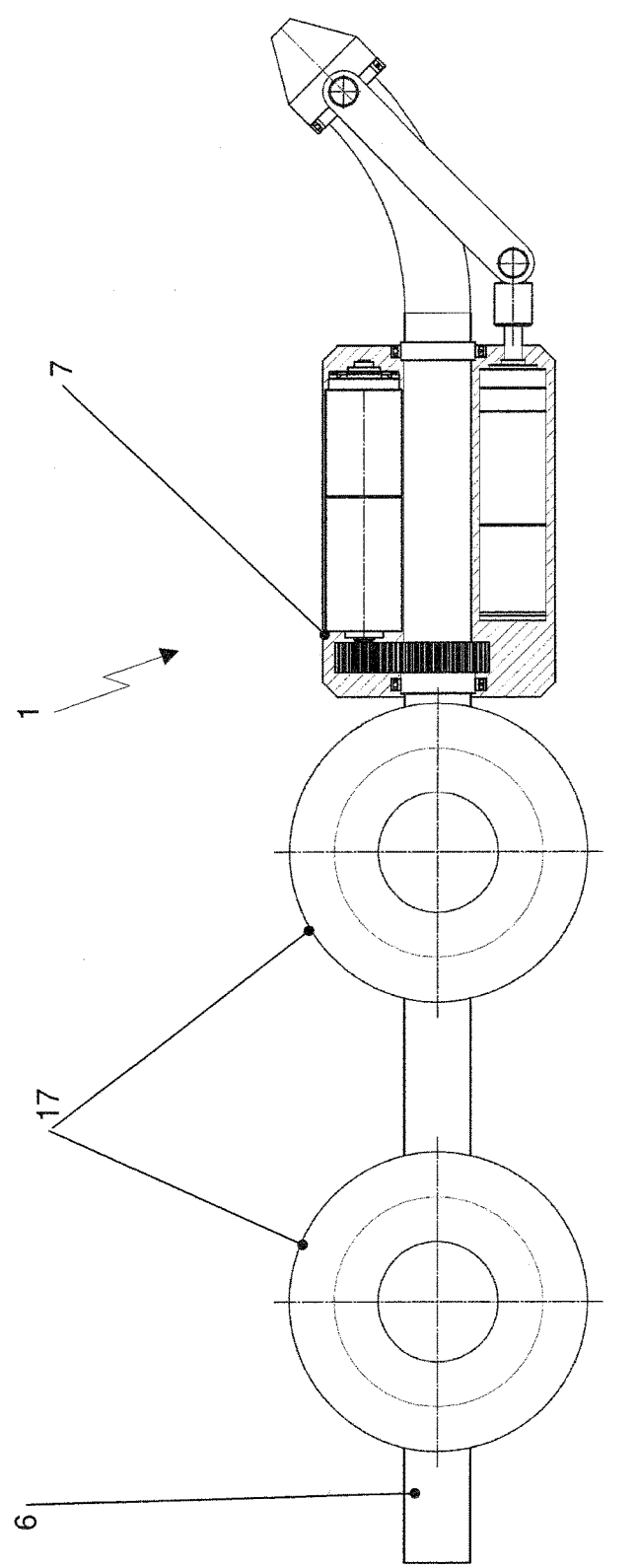
FIG. 6 a longitudinal section of the device for cleaning pipes on wheels.

FIG. 6 shows a device 1 for cleaning pipes, where a drive on wheels 17 is disposed at the cleaning hose 6 rearward of the housing. The wheels serve an axial movement of the cleaning hose 6 and the device 1 through the pipe 2. The drive insures that device 1 is able to move self-directed in large pipes 2.

Figure 7:
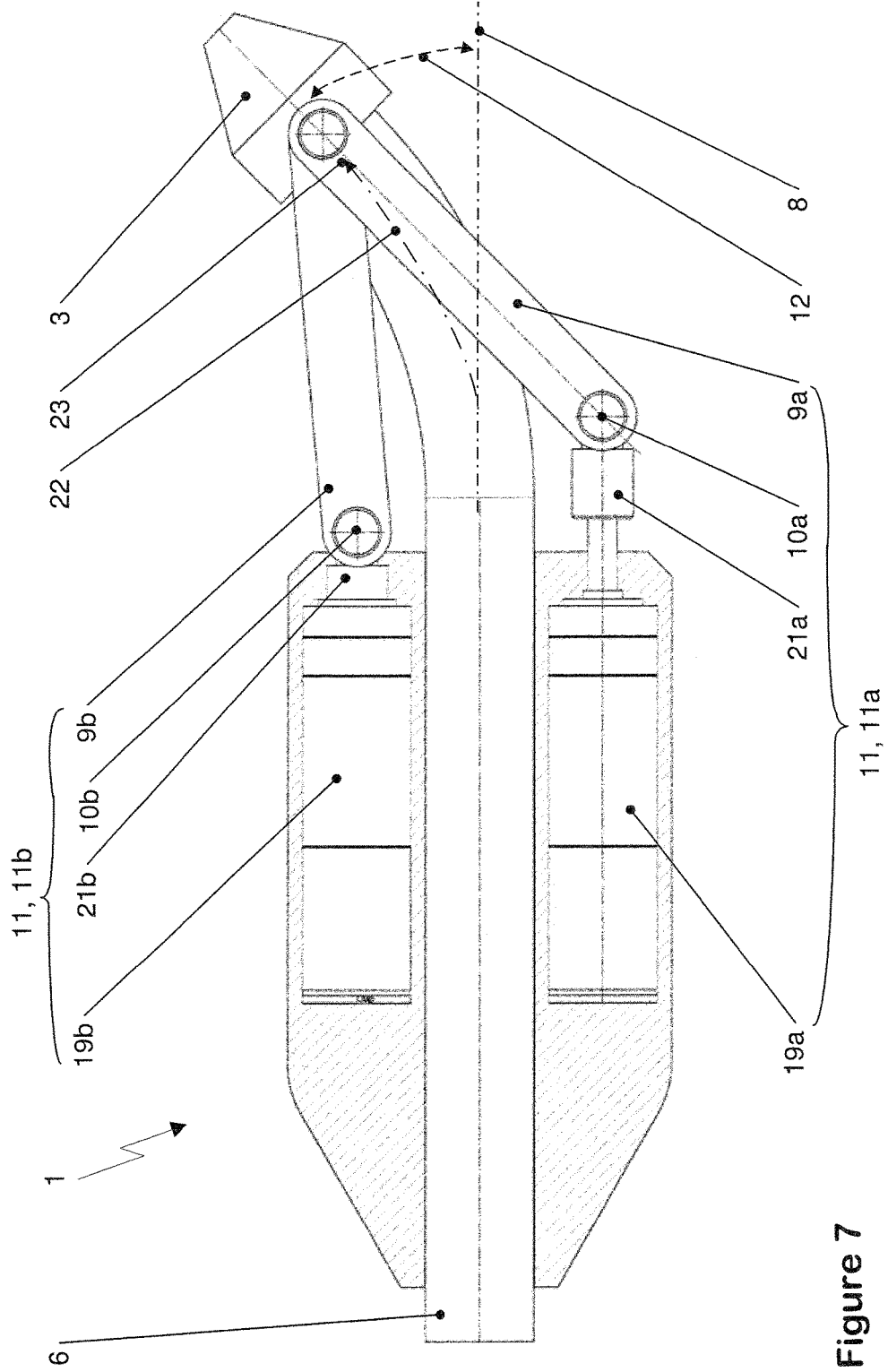
FIG. 7 a longitudinal section of a device for cleaning pipes having several swivel drives around the longitudinal axis.

FIG. 7 illustrates a longitudinal section of a device 1 for cleaning pipes in an alternative embodiment of a mechanism for the deflection of the nozzle 3 around the longitudinal axis 8. The mechanism for the deflection of nozzle 3 around the longitudinal axis comprises a number of swivel drives 11a, 11b positioned around the cleaning hose. In the schematic, much simplified view of FIG. 7, a first swivel drive 11a is placed below the longitudinal axis 8 and a second swivel drive 11b is place above the longitudinal axis 8. Each of the swivel drives 11a, 11b consists of a pivot arm 9a, 9b, a pivot axis 10a, 10b and a rotary drive motor 19a, 19b. The swivel motion 12 of the pivot arms 9a, 9b permits the front end area 6a of the cleaning hose with the firmly connected nozzle 3 to move, that is, to deflect relative to the longitudinal axis 8. The swivel drive motors 19a, 19b are spindle motors 19a, 19b in the embodiment of FIG. 7 each provided with a linearly movable spindle nut 21a, 21b. According to FIG. 7, the linear motion of the spindle nut 21a of the actuated swivel drive 11a results in a swivel motion 12 respectively a deflection 12 of the pivot arm 9a around the pivot axis 10a. This causes nozzle 3 into swivel motion 12, or deflection 12, at an angle relative to the longitudinal axis 8 while the front end area 6a of the cleaning hose 6 is bent from its hose axis 22 with a bending direction 23 in a bending plane, wherein the hose axis 22 is bent along a vertically oriented bending plane. In FIG. 7, the arrow at the bent hose axis 22 indicates a bending direction 23 in the vertical plane that extends upward.

Each of the swivel drives 11a, 11b thus represents a swivel mechanism 11 within the scope of the present invention or is at least a part thereof. The majority of the swivel drives 11a, 11b and thus the possibility of selecting a specific swivel drive 11a, 11b having a specific bending plane and bending direction 23 of the front end area 6a of the cleaning hose 6 allows moreover a deflection of the nozzle 3 around the longitudinal axis 8. Thus, in this embodiment, each swivel drive is swivel mechanism or part of swivel mechanism 11 and also part of the mechanism for deflecting nozzle 3 around the longitudinal axis 8.

Figure 8:
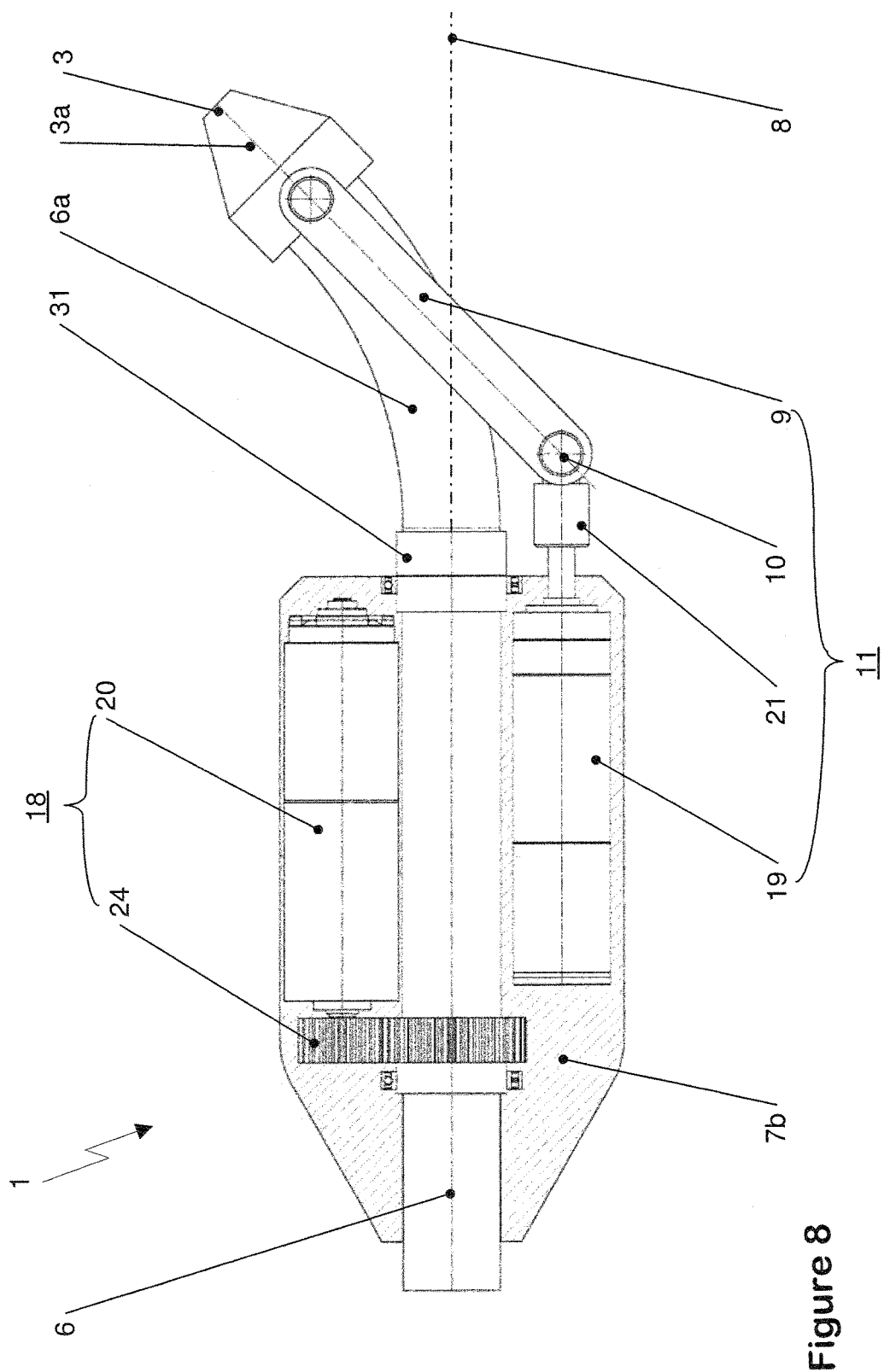
FIG. 8 a longitudinal section of a device for cleaning pipes with a rotary action, and FIG. 9 a schematic illustration of the nozzle jet oriented such that it is pointed at the soilage at the inner wall of the pipe while monitored by a camera.

FIG. 8 illustrates in a detail view, similar to FIG. 2, the longitudinal section of a device 1 for cleaning pipes, with swivel drive 11, comprising a spindle motor 19 a spindle nut 21, a pivot axis 10 and a pivot arm 9 as well as a rotary drive 18 for rotating housing 7b and swivel drive 11 around cleaning hose 6. The rotary drive 18 comprises a rotary drive motor 20 and a gear 24. Differing from FIG. 2, the device 1 according to FIG. 8 does not include a ball bearing at the attachment point of the swivel drive 11 or the pivot arm 9 in the area of the nozzle 3 at the front end area 6a of cleaning hose 6. Thus, the swivel drive 11 or pivot arm 9 is constructed so it is not rotatable around the nozzle 3 or nozzle axis 3a and around the front end area 6a of cleaning hose 6, but is firmly connected to nozzle 3 or front end area 6a. Compared to the device in FIG. 2, according to FIG. 8, a rotary bushing 31 between two hose sections is contemplated. As shown in the embodiment of FIG. 8, the rotary bushing 31 is positioned between the front end area 6a of cleaning hose 6 and the remaining part of cleaning hose 6. The rotary bushing 31 can however also be arranged at another location between hose sections or can be positioned between the nozzle 3 and the cleaning hose 6. The rotary bushing 31, independent of its placement permits a rotation of the nozzle 3 around the longitudinal axis 8 without any torsion of cleaning hose 6. In other words: a torsion of the cleaning hose 6 is prevented when the swivel drive 11 rotates around the cleaning hose 6, because the rotary bushing 31 allows a rotation of nozzle 3 around the longitudinal axis of nozzle 3, or the front end area 6a.

Figure 9:
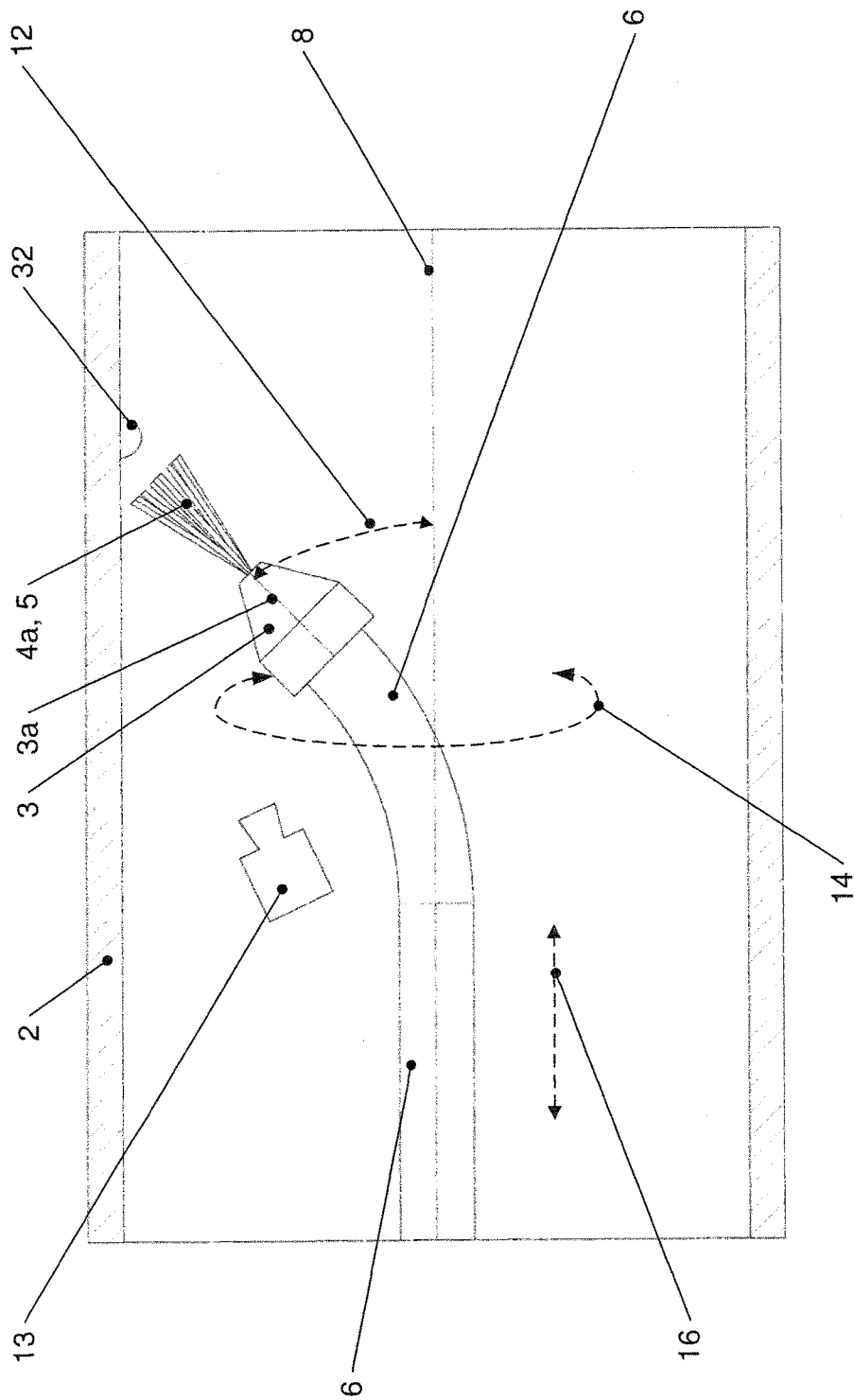

FIG. 9 shows a schematic illustration of the pinpointed position of the nozzle 3 to a soilage spot 32 at the inner wall of pipe 2 while being monitored by a camera. Such a pinpoint orientation of nozzle 3 or jet 4a of cleaning medium 5 from nozzle 3 onto soilage spot 32 can be realized with each of the devices 1 shown in detail in FIGS. 1-8. Thus, in a first dimension, nozzle 3 can be oriented in axial direction by the forward motion 16. The swivel motion 12 by which the nozzle 3 or the nozzle axis 3a is deflected at an angle relative to longitudinal axis 8 represents a second dimension. With the mechanism for deflecting nozzle 3 around longitudinal axis 8, a third dimension is realized, which while corresponding to a rotary motion 14 around the longitudinal axis 8, the devices 1 in FIGS. 2, 7 and 8 show that such a deflection of nozzle 3 around the longitudinal axis 8 is also possible without a torsion of cleaning hose 6. In like manner, in such a device 1 the camera 13 can be movable and oriented to facilitate capturing soilage spots 32 as well as monitoring the deflection of nozzle 3 and its orientation around the longitudinal axis 8.

REFERENCE NUMERALS

1 Device
2 Pipe
3 Nozzle
4 Nozzle axis
4a Jet
4b Rearward jets, high pressure jets
5 Fluid cleaning medium
6 Cleaning hose
6a Front end
7 Housing
7a Non-rotatable part of housing, housing part
7b Rotatable part of housing
8 Longitudinal axis
9 Pivot arm
9a Pivot arm of swivel drive 11a
9b Pivot arm of swivel drive 11b
10 Pivot axis
10a Pivot axis for swivel drive 11a
10b Pivot axis for swivel drive 11b
11 Pivot device
11a Pivot device actuated
11b Pivot device not actuated
12 Pivot motion of nozzle 3
13 Camera
14 Rotation, rotary motion, rotary motion deflection relative to the longitudinal axis 8
15 Bores
16 Axial motion
17 Wheels
18 Rotary drive
19 Swivel drive motor, spindle motor
19a Swivel drive motor, spindle motor
19b Swivel drive motor, spindle motor
20 Rotary drive motor
21 Spindle nut
21a Spindle nut of 11a
21b Spindle nut of 11b
22 Hose axis
23 Bending direction
24 Gear drive
24a First gear
24b Second gear
25 Ball bearing
26 Ball bearing
27 Point of reference
28 Fixing unit, capture unit
29 Outer wall
30 Recesses
31 Rotation action, rotary transmission
32 Soilage

The invention claimed is:

1. A pipe cleaning device comprising,
a nozzle movable in at least three axes relative to an inner wall of a pipe to send a jet of a fluid cleaning medium to any point at the inner wall of the pipe,
a hose connected to the nozzle to supply the fluid cleaning medium, said nozzle disposed at a front end area of the hose and axially movable along a longitudinal axis parallel to a pipe axis, for an axial movement within the pipe,
a swivel mechanism to deflect the nozzle at an angle relative to the longitudinal axis such that the front end area of the hose and a hose-axis are bent in a bending direction at a bending plane,
a drive mechanism to deflect the nozzle around the longitudinal axis without torsion of the hose when the bending direction and the bending plane of the front end area around the longitudinal axis are changed and
wherein a camera is arranged to record pipe soilage and monitor any movement and orientation of the cleaning nozzle,
wherein the drive mechanism is a swivel drive comprising, at least one rotary drive to rotate the swivel drive around the cleaning hose and the nozzle, wherein the front end area in each rotation position of the swivel drive around the cleaning hose is bent in the respective bending plane and bending direction without torsion of the cleaning hose.

2. The device of claim 1, wherein the swivel drive is supported by a bearing at the cleaning hose and the nozzle by which the swivel drive is rotatable around the front end area of the cleaning hose and the nozzle without torsion of the cleaning hose.

3. The device of claim 1, further comprising at least two additional swivel mechanisms positioned around the cleaning hose, said swivel drives are adjustable to control the bending of the front end of the cleaning hose into different bending directions and bending planes in dependence on activation of one of the swivel drives, wherein no torsion of the cleaning hose is caused by the deflection of the nozzle around the longitudinal axis.

4. The device of claim 1, wherein a rotary bushing is positioned between the nozzle and the front end area or at any point between two cleaning hose sections such that the swivel drive can rotate the nozzle around the longitudinal axis without torsion of the cleaning hose.

5. The device of claim 1, wherein the camera is connected to the swivel drive in such a way that it can swivel and rotate together with the swivel drive to pivot the camera in relation to the rotation of the nozzle, wherein the camera includes a unit for a permanent camera cleaning.

6. The device according to claim 1, wherein the hose is housed in a housing through which the hose extends, said housing including two housing parts, wherein at least one of the housing parts is connected to the swivel mechanism and rotatable around the longitudinal axis, wherein a rotary motion of the housing part leads to a rotary motion of the swivel mechanism around the longitudinal axis.

7. The device of claim 6, wherein one or more axial drives are provided for axial movement of the device along the longitudinal axis.

8. The device of claim 7, wherein the one of the axial drives comprises a plurality of rearward directed bores or auxiliary nozzles through which fluid cleaning medium is emitted such that an axial forward thrust of the device is realized.

9. The device of claim 8, wherein a valve is provided to control distribution of the fluid cleaning medium between the cleaning nozzle and the bores or auxiliary nozzles.

10. The device of claim 8, wherein the axial forward movement of the device is realized through the axial movement of the hose.

11. The device of claim 8, wherein the device is constructed expandable in axial direction, wherein an axial forward motion of the nozzle parallel to the longitudinal axis is realized.

12. The device of claim 1, further comprising wheels by which an axial forward movement of the device is realized.

13. The device of claim 12, wherein a drive on wheels is provided to axially move the cleaning device forward in the pipe.

14. The device of claim 1, further comprising a fixation unit radially expandable within the pipe, wherein the device is rendered stationary by the fixation unit when maximally expanded by application of pressure and pressed against an inner pipe wall, wherein recesses between the expanded fixation unit and the inner pipe wall represent a flow channel for draining the fluid cleaning medium together with soilage from the pipe clear of the device.

15. The device of claim 1, wherein the nozzle is deflected at an angle between 0° and +/−90° relative to the longitudinal axis.

* * * * *